(12) United States Patent
Kumar

(10) Patent No.: US 11,573,375 B2
(45) Date of Patent: Feb. 7, 2023

(54) LOW LOSS HIGH EFFICIENCY PHOTONIC PHASE SHIFTER WITH DIELECTRIC ELECTRODES

(71) Applicant: PsiQuantum, Corp., Palo Alto, CA (US)

(72) Inventor: Nikhil Kumar, Palo Alto, CA (US)

(73) Assignee: PSIQUANTUM, CORP., Palo Alto, CA (US)

( * ) Notice: Subject to any disclaimer, the term of this patent is extended or adjusted under 35 U.S.C. 154(b) by 0 days.

(21) Appl. No.: 17/671,368

(22) Filed: Feb. 14, 2022

(65) Prior Publication Data
US 2022/0163725 A1    May 26, 2022

Related U.S. Application Data

(63) Continuation of application No. 17/160,133, filed on Jan. 27, 2021, now Pat. No. 11,300,732.
(Continued)

(51) Int. Cl.
*G02B 6/293* (2006.01)
*G02F 1/21* (2006.01)
(Continued)

(52) U.S. Cl.
CPC ....... *G02B 6/29353* (2013.01); *G02B 6/2766* (2013.01); *G02B 6/3502* (2013.01); *G02F 1/212* (2021.01)

(58) Field of Classification Search
CPC ............... G02B 6/2766; G02B 6/3502; G02B 6/29353; G02F 1/212; G02F 1/025; G02F 1/035; G02F 1/225
See application file for complete search history.

(56) References Cited

U.S. PATENT DOCUMENTS

| 4,801,557 A | 1/1989 | Wessels et al. |
| 5,064,684 A | 11/1991 | Mir et al. |

(Continued)

FOREIGN PATENT DOCUMENTS

| CN | 100371766 C | 2/2008 |
| CN | 105829957 A | 8/2016 |

(Continued)

OTHER PUBLICATIONS

Office Action and Search Report in Tawain Patent Application No. 110107414 dated Feb. 21, 2022, 23 pgs.
(Continued)

*Primary Examiner* — Andrew Jordan
(74) *Attorney, Agent, or Firm* — Kowert, Hood, Munyon, Rankin & Goetzel, P.C.

(57) ABSTRACT

Photonic devices are disclosed including a first cladding layer, a first electrical contact comprising a first lead coupled to a first dielectric portion, a second electrical contact comprising a second lead coupled to a second dielectric portion, a waveguide structure comprising a slab layer comprising a first material, and a second cladding layer. The slab layer may be coupled to the first dielectric portion of the first electrical contact and the second dielectric portion of the second electrical contact. The first dielectric portion and the second dielectric portion may have a dielectric constant greater than a dielectric constant of the first material.

20 Claims, 11 Drawing Sheets

Related U.S. Application Data

(60) Provisional application No. 62/967,166, filed on Jan. 29, 2020.

(51) Int. Cl.
*G02B 6/27* (2006.01)
*G02B 6/35* (2006.01)

(56) References Cited

U.S. PATENT DOCUMENTS

| | | | |
|---|---|---|---|
| 5,185,317 A | 2/1993 | Wessels et al. | |
| 5,270,298 A | 12/1993 | Ramesh | |
| 5,296,460 A | 3/1994 | Wessels et al. | |
| 5,442,585 A | 8/1995 | Eguchi et al. | |
| 5,663,556 A | 9/1997 | Wessels et al. | |
| 5,731,220 A | 3/1998 | Tsu et al. | |
| 5,753,300 A | 5/1998 | Wessels et al. | |
| 5,911,018 A | 6/1999 | Bischel et al. | |
| 6,118,571 A | 9/2000 | Wessels et al. | |
| 6,122,429 A | 9/2000 | Wessels et al. | |
| 6,208,453 B1 | 3/2001 | Wessels et al. | |
| 6,303,393 B1 | 10/2001 | Wessels et al. | |
| 6,477,285 B1 | 11/2002 | Shanley | |
| 6,493,497 B1 | 12/2002 | Ramdani et al. | |
| 6,585,424 B2 | 7/2003 | Chason et al. | |
| 6,594,414 B2 | 7/2003 | Tungare | |
| 6,684,007 B2 | 1/2004 | Yoshimura et al. | |
| 7,020,374 B2 | 3/2006 | Talin et al. | |
| 7,224,869 B2 | 5/2007 | Cole et al. | |
| 7,224,878 B1 | 5/2007 | Wessels et al. | |
| 7,283,689 B1 | 10/2007 | Block et al. | |
| 7,421,179 B1 | 9/2008 | Jiang et al. | |
| 7,426,326 B2 | 9/2008 | Moeller et al. | |
| 9,494,734 B1 | 11/2016 | Jain et al. | |
| 9,535,308 B2 | 1/2017 | Li et al. | |
| 9,664,931 B1 | 5/2017 | Yap et al. | |
| 9,671,670 B2 | 6/2017 | Hollis et al. | |
| 10,163,825 B1 | 12/2018 | Liao et al. | |
| 10,247,999 B1 | 4/2019 | Yap et al. | |
| 10,627,696 B1 | 4/2020 | Chang et al. | |
| 10,770,414 B2 | 9/2020 | Liao et al. | |
| 10,901,296 B1* | 1/2021 | Eltes | G02F 1/3501 |
| 11,009,727 B2* | 5/2021 | Eltes | G02F 1/035 |
| 11,036,111 B2* | 6/2021 | Chang | G02F 1/3136 |
| 11,256,115 B1* | 2/2022 | Gibson | G02F 1/31 |
| 11,300,732 B2* | 4/2022 | Kumar | G02B 6/3502 |
| 2002/0028045 A1 | 3/2002 | Koshimura et al. | |
| 2002/0181825 A1 | 12/2002 | Johnson et al. | |
| 2003/0015712 A1 | 1/2003 | Vieira et al. | |
| 2003/0017625 A1 | 1/2003 | Litvin | |
| 2005/0201686 A1 | 9/2005 | Cole et al. | |
| 2007/0165977 A1 | 7/2007 | Cole et al. | |
| 2008/0089633 A1 | 4/2008 | Moeller et al. | |
| 2009/0231686 A1 | 9/2009 | Atkins et al. | |
| 2010/0002994 A1 | 1/2010 | Baehr-Jones et al. | |
| 2010/0290732 A1 | 11/2010 | Gill | |
| 2012/0155824 A1 | 6/2012 | Suzuki et al. | |
| 2015/0086219 A1 | 3/2015 | Li et al. | |
| 2016/0291350 A1 | 10/2016 | Fukikata et al. | |
| 2016/0313579 A1 | 10/2016 | Yokoyama et al. | |
| 2016/0349546 A1 | 12/2016 | Abel et al. | |
| 2018/0011347 A1 | 1/2018 | Ishikura | |
| 2018/0373067 A1 | 12/2018 | Fukikata | |
| 2019/0173190 A1 | 6/2019 | Johnson et al. | |
| 2019/0244866 A1 | 8/2019 | ZILKIE et al. | |
| 2019/0384073 A1 | 12/2019 | Yu et al. | |
| 2019/0393171 A1 | 12/2019 | Liao et al. | |
| 2020/0150467 A1* | 5/2020 | Eltes | G02F 1/035 |
| 2020/0301238 A1 | 9/2020 | Chang et al. | |
| 2020/0381377 A1 | 12/2020 | Liao et al. | |
| 2021/0066219 A1 | 3/2021 | Chen et al. | |
| 2021/0231876 A1 | 7/2021 | Kumar | |
| 2021/0278708 A1* | 9/2021 | Kumar | G02F 1/035 |
| 2021/0278738 A1* | 9/2021 | Kumar | G02F 1/212 |
| 2021/0397064 A1* | 12/2021 | Chang | G02F 1/3132 |
| 2022/0163720 A1* | 5/2022 | Kugimoto | G02F 1/0356 |
| 2022/0163725 A1* | 5/2022 | Kumar | G02B 6/29353 |

FOREIGN PATENT DOCUMENTS

| | | |
|---|---|---|
| CN | 205942163 U | 2/2017 |
| CN | 107430297 A | 12/2017 |
| CN | 109387820 A | 2/2019 |
| EP | 0782017 A2 | 7/1997 |
| TW | 200839330 A | 10/2008 |
| TW | 1585477 B | 6/2017 |
| WO | 2007065447 A1 | 6/2007 |

OTHER PUBLICATIONS

Office Action and Search Report in Tawan Patent Application No. 110103310 dated Feb. 10, 2022, 11 pgs.

Office Action and Search Report in Taiwan Patent Application No. 110107413 dated Mar. 3, 2022, 14 pgs.

Alexander, K., et al., "Nanophotonic Pockels modulators on a silicon nitride platform", Photonics Research Group, INTEC Department, Ghent University-imec, Ghent B-9000, Belgium Liquid Crystals and Photonics Group, ELIS Deparlment, Ghent University, Ghent B-9000, Belgium IDLab, INTEC Department, Ghent University-imec, Ghent B-9000, Belgium Center for Nano- and Biophotonics (NB-Photonics), Ghent University, Ghent B-9000, Belgium, dated: Jun. 14, 2018, 11 pgs.

International Search Report and Written Opinion of International Application No. PCT/US2021/015294, dated May 10, 2021, 14 pgs.

International Search Report and Written Opinion for International Application No. PCT/US2021/020337, dated Jun. 25, 2021, 12 pgs.

Elliott Ortmann J et al: "Ultra-Low-Power Tuning in Hybrid Barium Titanate-Silicon Nitride Electro-Optic Devices on Silicon", arxiv.org, Cornell University Library, 201 Olin Library Cornell University Ithaca, NY 14853, Nov. 26, 2019, 8 pgs.

Felix El Tes et al.: "A BaTi03-Based Electro-Optic Pockels Modulator Monolithically Integrated on an Advanced Silicon Photonics Platform", arxiv.org, Cornell University Library, 201 Olin Library Cornell University Ithaca, NY 14853, Nov. 6, 2019, 7 pgs.

El Tes F et al.: "First cryogenic electro-optic switch on silicon with high bandwidth and low power tunability," 2018 IEEE International Electron Devices Meeting (IEDM), IEEE, Dec. 1, 2018, 4 pgs.

International Search Report and Written Opinion for International Application No. PCT/US2021/020330, dated Jun. 2, 2021, 12 pgs.

International Search Report and Written Opinion for International Application No. PCT/US2021/020341, dated Jun. 25, 2021, 12 pgs.

* cited by examiner

LOW LOSS HIGH EFFICIENCY PHOTONIC PHASE SHIFTER WITH DIELECTRIC ELECTRODES

PRIORITY CLAIM

This application is a continuation of U.S. patent application Ser. No. 17/160,133, titled "LOW LOSS HIGH EFFICIENCY PHOTONIC PHASE SHIFTER", filed Jan. 27, 2021, which claims priority to U.S. Provisional Patent Application No. 62/967,166, titled "Low Loss High Efficiency Photonic Phase Shifter" and filed on Jan. 29, 2020, which are both hereby incorporated by reference in their entirety as though fully and completely set forth herein.

The claims in the instant application are different than those of the parent application and/or other related applications. The Applicant therefore rescinds any disclaimer of claim scope made in the parent application and/or any predecessor application in relation to the instant application. Any such previous disclaimer and the cited references that it was made to avoid, may need to be revisited. Further, any disclaimer made in the instant application should not be read into or against the parent application and/or other related applications.

TECHNICAL FIELD

Embodiments herein relate generally to electro-optic devices such as phase shifter and switches.

BACKGROUND

Electro-optic (EO) modulators and switches have been used in optical fields. Some EO modulators utilize free-carrier electro-refraction, free-carrier electro-absorption, or the DC Kerr effect to modify optical properties during operation, for example, to change the phase of light propagating through the EO modulator or switch. As an example, optical phase modulators can be used in integrated optics systems, waveguide structures, and integrated optoelectronics.

Despite the progress made in the field of EO modulators and switches, there is a need in the art for improved methods and systems related to EO modulators and switches.

SUMMARY

Some embodiments described herein relate to photonic devices such as electro-optical switches and phase shifters. The device may include a first cladding layer, a first electrical contact comprising a first lead coupled to a first dielectric portion, a second electrical contact comprising a second lead coupled to a second dielectric portion, a waveguide structure comprising a slab layer comprising a first material, and a second cladding layer. The slab layer may be coupled to the first dielectric portion of the first electrical contact and the second dielectric portion of the second electrical contact.

The first dielectric portion and the second dielectric portion may have a dielectric constant greater than a dielectric constant of the first material in the direction separating the first and second dielectric portions. The dielectric constant of the first dielectric portion and the second dielectric portion may be greater than the dielectric constant of the first material at a first temperature that is greater than 1 mK, less than 77K, less than 150K, and/or within another temperature range. In some embodiments, the first material is a transparent material having an index of refraction that is larger than an index of refraction of the first and second cladding layers. In some embodiments, a ratio between the dielectric constant of the first and second dielectric portions and the dielectric constant of the first material is 2 or greater.

The waveguide structure may include a first ridge portion comprising the first material and coupled to the slab layer, where the first ridge portion is disposed between the first electrical contact and the second electrical contact. The ridge portion may be disposed on a first side of the slab layer and may extend into the first cladding layer, and the first dielectric portion and the second dielectric portion may coupled to the slab layer on the first side of the slab layer abutting the ridge portion of the waveguide structure.

In other embodiments, the ridge portion is disposed on a first side of the slab layer and extends into the first cladding layer, where the first dielectric portion and the second dielectric portion are coupled to the slab layer on a second side of the slab layer opposite the first side. In some embodiments, the first electrical contact and the second electrical contact are disposed on the second side of the slab layer.

In some embodiments, the first electrical contact is coupled to the first dielectric portion by penetrating through the slab layer from the second side of the slab layer to the first side of the slab layer, and the second electrical contact is coupled to the second dielectric portion by penetrating through the slab layer from the second side of the slab layer to the first side of the slab layer.

In some embodiments, the first dielectric portion and the second dielectric portion are composed of one of strontium titanate (STO), barium strontium titanate (BST), hafnium oxide, zirconium oxide, titanium oxide, graphene oxide, tantalum oxide, lead zirconium titanate (PZT), lead lanthanum zirconium titanate (PLZT), or strontium barium niobate (SBN).

In some embodiments, the first material is one of barium titanate (BTO), barium strontium titanate (BST), lithium niobate, lead zirconium titanate (PZT), lead lanthanum zirconium titanate (PLZT), aluminum oxide, aluminum nitride, or strontium barium niobate (SBN).

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

For a better understanding of the various described embodiments, reference should be made to the Detailed Description below, in conjunction with the following drawings in which like reference numerals refer to corresponding parts throughout the Figures.

Figure 1:
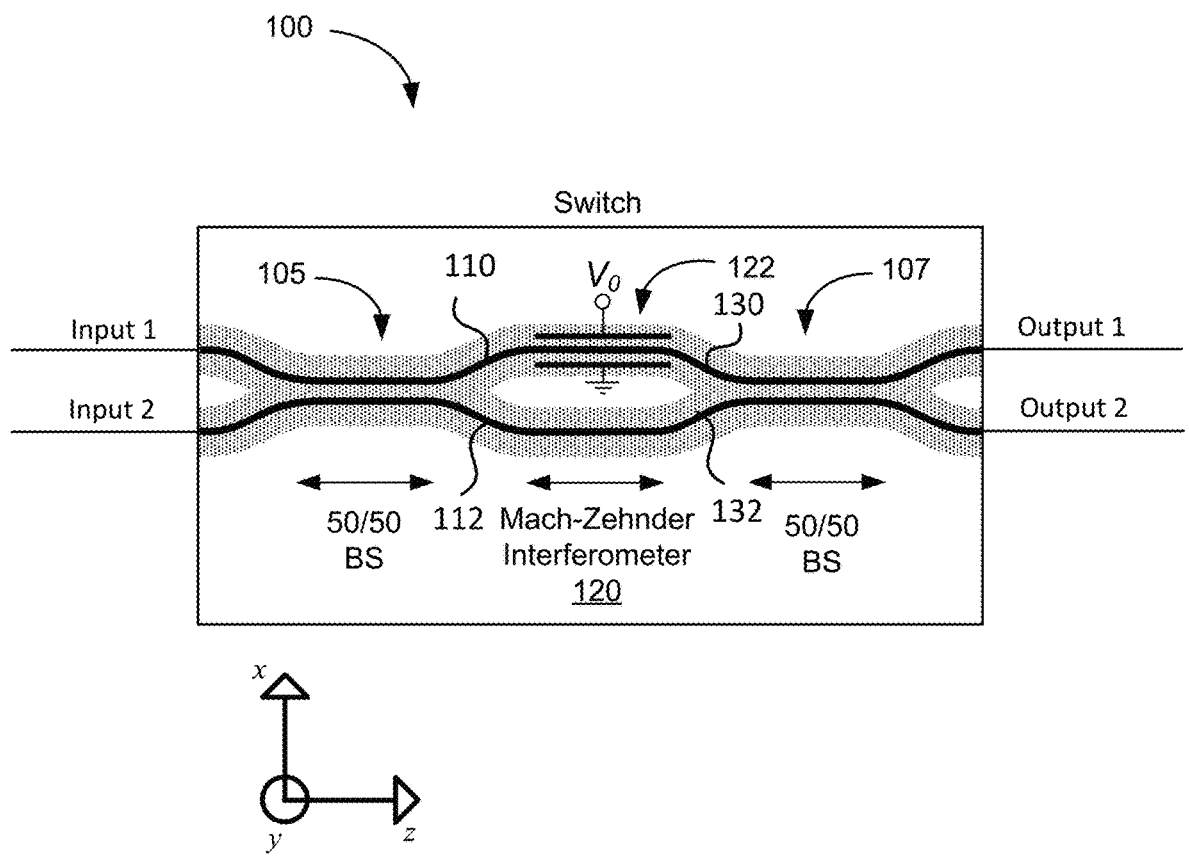
FIG. 1 is a simplified schematic diagram illustrating an optical switch according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

Embodiments of the present invention relate to optical systems. More particularly, embodiments of the present invention utilize high dielectric constant materials (i.e., high-κ materials) in optical modulators and switches to reduce power consumption during operation. It is noted that, as used herein, a "high dielectric constant material" is intended to refer to a material with a high dielectric permittivity compared to other materials within operative components of the optical modulator or switch, and in particular compared to the material used to construct the waveguide. Merely by way of example, embodiments of the present invention are provided in the context of integrated optical systems that include active optical devices, but the invention is not limited to this example and has wide applicability to a variety of optical and optoelectronic systems.

According to some embodiments, the active photonic devices described herein utilize electro-optic effects, such as free carrier induced refractive index variation in semiconductors, the Pockels effect, and/or the DC Kerr effect to implement modulation and/or switching of optical signals. Thus, embodiments of the present invention are applicable to both modulators, in which the transmitted light is modulated either ON or OFF, or light is modulated with a partial change in transmission percentage, as well as optical switches, in which the transmitted light is output on a first output (e.g., waveguide) or a second output (e.g., waveguide) or an optical switch with more than two outputs, as well as more than one input. Thus, embodiments of the present invention are applicable to a variety of designs including an M(input)×N(output) systems that utilize the methods, devices, and techniques discussed herein.

FIG. 1 is a simplified schematic diagram illustrating an optical switch according to an embodiment of the present invention. Referring to FIG. 1, switch 100 includes two inputs: Input 1 and Input 2 as well as two outputs: Output 1 and Output 2. As an example, the inputs and outputs of switch 100 can be implemented as optical waveguides operable to support single mode or multimode optical beams. As an example, switch 100 can be implemented as a Mach-Zehnder interferometer integrated with a set of 50/50 beam splitters 105 and 107, respectively. As illustrated in FIG. 1, Input 1 and Input 2 are optically coupled to a first 50/50 beam splitter 105, also referred to as a directional coupler, which receives light from the Input 1 or Input 2 and, through evanescent coupling in the 50/50 beam splitter, directs 50% of the input light from Input 1 into waveguide 110 and 50% of the input light from Input 1 into waveguide 112. Concurrently, first 50/50 beam splitter 105 directs 50% of the input light from Input 2 into waveguide 110 and 50% of the input light from Input 2 into waveguide 112. Considering only input light from Input 1, the input light is split evenly between waveguides 110 and 112.

Mach-Zehnder interferometer 120 includes phase adjustment section 122. Voltage Vo can be applied across the waveguide in phase adjustment section 122 such that it can have an index of refraction in phase adjustment section 122 that is controllably varied. Because light in waveguides 110 and 112 still have a well-defined phase relationship (e.g., they may be in-phase, 180° out-of-phase, etc.) after propagation through the first 50/50 beam splitter 105, phase adjustment in phase adjustment section 122 can introduce a predetermined phase difference between the light propagating in waveguides 130 and 132. As will be evident to one of skill in the art, the phase relationship between the light propagating in waveguides 130 and 132 can result in output light being present at Output 1 (e.g., light beams are in-phase) or Output 2 (e.g., light beams are out of phase), thereby providing switch functionality as light is directed to Output 1 or Output 2 as a function of the voltage Vo applied at the phase adjustments section 122. Although a single active arm is illustrated in FIG. 1, it will be appreciated that both arms of the Mach-Zehnder interferometer can include phase adjustment sections.

As illustrated in FIG. 1, electro-optic switch technologies, in comparison to all-optical switch technologies, utilize the application of the electrical bias (e.g., Vo in FIG. 1) across the active region of the switch to produce optical variation. The electric field and/or current that results from application of this voltage bias results in changes in one or more optical properties of the active region, such as the index of refraction or absorbance.

Although a Mach-Zehnder interferometer implementation is illustrated in FIG. 1, embodiments of the present invention are not limited to this particular switch architecture and other phase adjustment devices are included within the scope of the present invention, including ring resonator designs, Mach-Zehnder modulators, generalized Mach-Zehnder modulators, and the like. One of ordinary skill in the art would recognize many variations, modifications, and alternatives.

Figure 10:
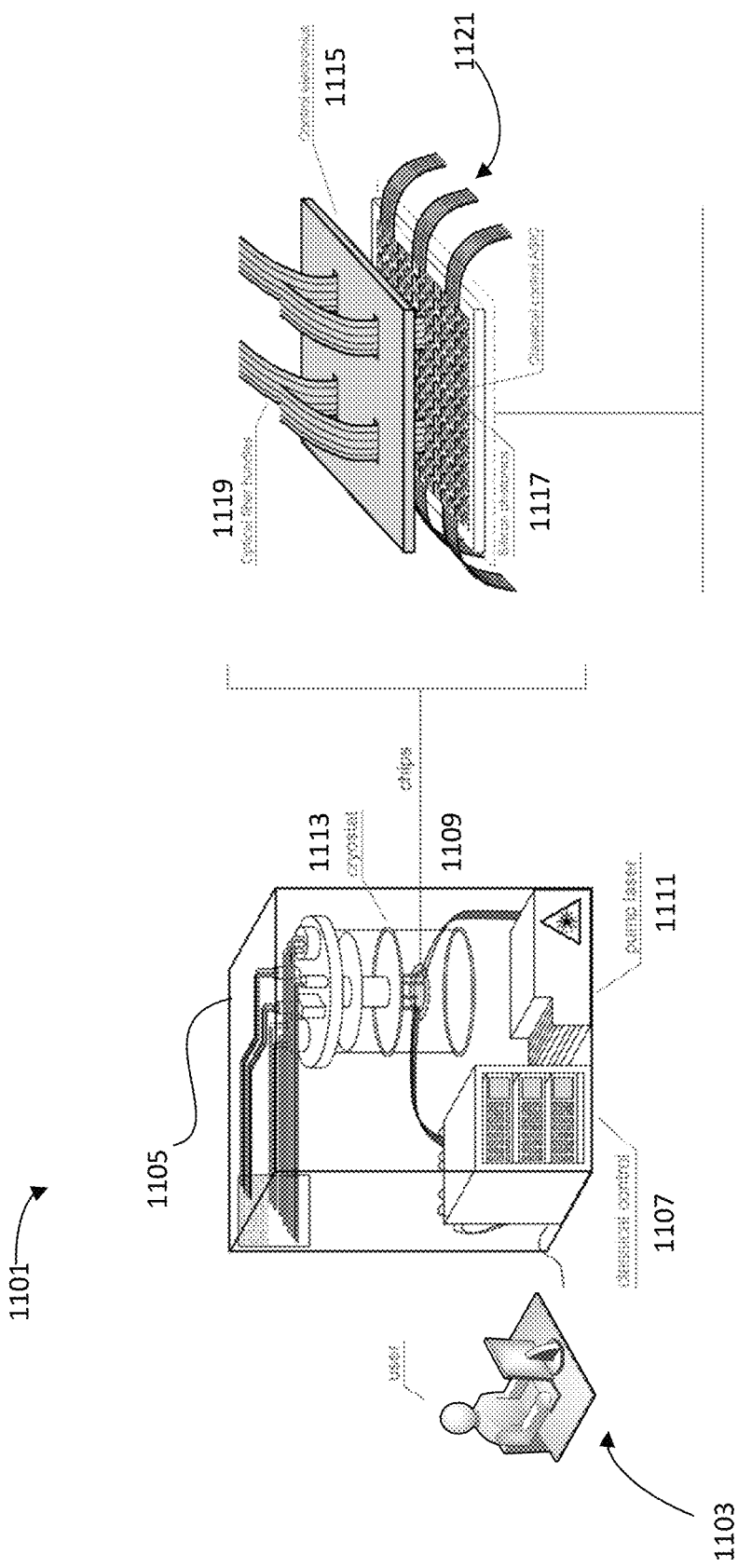
FIG. 10 is an illustration of a user interfacing with a hybrid quantum computing device, according to some embodiments.

In some embodiments, the optical phase shifter devices described herein may be utilized within a quantum computing system such as the hybrid quantum computing system shown in FIG. 10. Alternatively, these optical phase shifter devices may be used in other types of optical systems. For example, other computational, communication, and/or technological systems may utilize photonic phase shifters to direct optical signals (e.g., single photons or continuous wave (CW) optical signals) within a system or network, and phase shifter architectures described herein may be used within these systems, in various embodiments.

FIGS. 2-8—Cross Sections of Photonic Phase Shifters

FIGS. 2-8 are simplified cross-section diagrams illustrating various architectures for a photonic phase shifter, according to various embodiments. Note that the architectures shown in FIGS. 2-8 are schematic illustrations, and are not necessarily drawn to scale. While the architectures shown in FIG. 2-8 differ in several important design features, they also share some features in common. For example, as described in greater detail below, each of FIGS. 2-8 exhibit two electrical contacts, and each electrical contact includes a lead (230, 330, 430, 530, 630, 730, and 830, as well as 232, 332, 432, 532, 632, 732, and 832) connected to a dielectric electrode (240, 340, 440, 540, 640, 740, and 840, as well as 242, 342, 442, 542, 642, 742, and 842). In some embodiments, the leads may be composed of a metal, or alternatively, a semiconductor material.

The dielectric electrodes are configured to extend in close proximity to the location of the optical mode in the wave guide, and the photonic phase shifter is configured such that a controllable voltage difference may be introduced across the two dielectric electrodes, to alter the accumulated phase of a photonic mode travelling through the waveguide. For example, the dielectric electrodes may be coupled, via the leads, to a voltage source that imposes the controllable voltage difference.

Importantly, the dielectric electrodes may be composed of a high-κ material with a large dielectric constant, such that the dielectric electrodes have a larger dielectric constant than the material of the waveguide and/or the slab layer. As used herein, κ is used to represent the dielectric constant, which refers to the real component of the relative permittivity, $\kappa=Re(\varepsilon_r)=Re(\varepsilon/\varepsilon_0)$, where $\varepsilon_r$ is the complex-valued relative permittivity, ε is the absolute permittivity of the material, and $\varepsilon_0$ is the permittivity free space. It is noted for clarity that the imaginary component of $\varepsilon_r$ is related to the conductivity of the material, whereas the real component, κ, is related to the dielectric polarizability of the material.

The dielectric constant of a material may have a different value in the presence of a direct current (DC) voltage compared to an (AC) voltage, and the dielectric constant of the material in an AC voltage may be a function of frequency, κ(ω). Accordingly, in some embodiments, when selecting a material for the dielectric electrodes, the slab layer, and/or the ridge waveguide, the dielectric constant of the material may be considered at the operating frequency of the photonic phase shifter.

The dielectric electrodes may be composed of a material with a higher dielectric constant along the direction separating the first and second dielectric portions (e.g., the x-direction in FIGS. 2-5 and 7-8, or the y-direction in FIG. 6) than the first material of the slab layer. For example, in anisotropic media, the permittivity tensor E may be expressed by the following matrix which relates the electric field E to the electric displacement D.

$$\begin{bmatrix} D_x(\vec{r}) \\ D_y(\vec{r}) \\ D_z(\vec{r}) \end{bmatrix} = \begin{bmatrix} \varepsilon_{xx} & \varepsilon_{xy} & \varepsilon_{xz} \\ \varepsilon_{yx} & \varepsilon_{yy} & \varepsilon_{yz} \\ \varepsilon_{zx} & \varepsilon_{zy} & \varepsilon_{zz} \end{bmatrix} \begin{bmatrix} E_x(\vec{r}) \\ E_y(\vec{r}) \\ E_z(\vec{r}) \end{bmatrix}, \quad (1)$$

where the components $\varepsilon_{xx}$, $\varepsilon_{xy}$, etc., denote the individual components of the permittivity tensor. In some embodiments, the material of the first and second dielectric electrodes may be selected such that the diagonal component of the permittivity tensor along the direction separating the dielectric electrodes is larger than the corresponding diagonal component of the permittivity tensor of the material of the slab layer and/or the waveguide structure.

TABLE 1

$\chi^{(3)}$, Refractive Index, and Dielectric Constant Values for Various Materials

| Material | $\chi^{(3)}$ (m²/W) | Refractive Index (at 1.55 μm) | Dielectric Constant |
|---|---|---|---|
| Si | $2.2 \times 10^{-18}$ | ~3.5 | 11.7 |
| Si₃N₄ | $2 \times 10^{-19}$ | 2 | 7-8 |
| | $1.6 \times 10^{-18}$ | 2.5 | |
| | $2 \times 10^{-18}$ | 2.7 | |
| Ta₂O₅ | $1 \times 10^{-18}$-$4 \times 10^{-18}$ | 2.08 | 25-50 |
| TiO₂ | $5 \times 10^{-18}$-$6 \times 10^{-17}$ | 2.27-2.6 | 10-85 |
| Graphene Oxide | $4.5 \times 10^{-14}$ | 2.2 ( at 1.2 μm) | 2-50 |
| STO | | ~2.3 | 10,000-24,000 (below 10K) |
| BTO | r42 >150 pm/V | ~2.3 | 150-200 (below 10K) 1000 to 3000 (at 300K) |

Table 1 illustrates the $\chi^{(3)}$, refractive index, and dielectric constant values for a variety of materials. As shown in Table 1, STO has an extremely high dielectric constant for temperatures below 10K, such that STO may be a desirable material to use for the dielectric electrodes, while BTO may be used for the slab layer and/or ridge portion of the waveguide, in some embodiments.

As illustrated, the architectures shown in each of FIGS. 2-8 exhibit a photonic device comprising first and second cladding layers. For example, the regions marked 210, 310,

410, 510, 610, 710, and 810 represent first cladding layers on one side of the waveguide, while the regions marked 212, 312, 412, 512, 612, 712, and 812 represent second cladding layers on the other side of the waveguide. It is noted that the terms "first" and "second" are meant simply to distinguish between the two cladding layers, and, for example, the term "first cladding layer" may refer to the cladding layer on either side of the waveguide. The index of refraction of the first and second cladding layers may be lower than the index of refraction of the waveguide structure, in some embodiments.

FIGS. 2-8 further exhibit a first electrical contact including a first lead (230, 330, 430, 530, 630, 730, and 830) coupled to a first dielectric portion (240, 340, 440, 540, 640, 740, and 840) and a second electrical contact including a second lead (232, 332, 432, 532, 632, 732, and 842) coupled to a second dielectric portion (242, 342, 442, 542, 642, 742, and 842). The first and second leads may be composed of a conducting material such as a metal, or alternatively they may be composed of a semiconductor material. In various embodiments, the first dielectric portion and the second dielectric portion are composed of one or more of strontium titanate (STO), barium titanate (BTO), barium strontium titanate (BST), hafnium oxide, lithium niobite, zirconium oxide, titanium oxide, graphene oxide, tantalum oxide, lead zirconium titanate (PZT), lead lanthanum zirconium titanate (PLZT), strontium barium niobate (SBN), aluminum oxide, aluminum oxide, or doped variants or solid solutions thereof.

FIGS. 2-8 illustrate a waveguide structure including a slab layer (220, 320, 420, and 520, 651, 754, and 851) comprising a first material, wherein the slab layer is coupled to the first dielectric portion of the first electrical contact and the second dielectric portion of the second electrical contact. In some embodiments, the waveguide structure further includes a ridge portion (251, 351, 451, and 551) composed of the first material (or a different material, e.g., silicon nitride or any other material) and coupled to the slab layer, where the ridge portion is disposed between the first electrical contact and the second electrical contact. In various embodiments, the first material is one of strontium titanate (STO), barium titanate (BTO), barium strontium titanate (BST), hafnium oxide, lithium niobite, zirconium oxide, titanium oxide, graphene oxide, tantalum oxide, lead zirconium titanate (PZT), lead lanthanum zirconium titanate (PLZT), strontium barium niobate (SBN), aluminum oxide, aluminum oxide, or doped variants or solid solutions thereof.

In some embodiments, a second material composing the first and second dielectric portions may be selected based on the first material composing the slab layer and/or the waveguide structure. For example, the second material may be selected such that the second material has a larger dielectric constant than the dielectric constant of the first material. As one example, if the first material is BTO, the second material may be selected to be STO, which has a larger dielectric constant than BTO at the cryogenic temperatures (e.g., 4K) at which the photonic device is intended to operate. Advantageously, the large dielectric constant of the dielectric electrodes may enable the dielectric electrodes to be placed in closer proximity to the waveguide compared to metallic electrodes, for a given acceptable level of loss from the waveguide into the electrodes. For example, the high conductivity of a metallic electrode will result in a larger degree of photon absorption (i.e., loss) from the waveguide compared to the absorption of a dielectric electrode at the same separation from the waveguide. Accordingly, the dielectric electrodes may be placed in closer proximity to the waveguide than metallic electrodes for a given loss tolerance. The high dielectric constant of the dielectric electrodes corresponds to a high polarizability of the dielectric material, which in turn results in an energy-efficient control mechanism to adjust the electric field within the waveguide structure.

In some embodiments, the materials used for the dielectric electrodes, and the waveguide structure may be selected based on their effective dielectric constants. For example, while the dielectric constant (or the dielectric tensor for anisotropic materials) of a material is an intrinsic material property, the effective dielectric constant of a structure is proportional to its dielectric constant but also depends on the shape and dimensions of the structure. In these embodiments, the material used for the first and second dielectric portions may be selected such that the effective dielectric constant of the first and second dielectric portions is greater than an effective dielectric constant of the waveguide structure.

In some embodiments, a cryogenic device such as the cryostat 1113 shown in FIG. 10 may be configured to maintain the first electrical contact, the second electrical contact, and the waveguide structure at a cryogenic temperature, e.g., at or below 77 Kelvin.

In some embodiments, the first electric contact and the second electrical contact are configured to generate an electric field along one or more directions, e.g., along the x-direction in the waveguide structure, and the waveguide structure may be characterized by an electro-optic coefficient, (e.g., $\chi^{(2)}$, the Pockel's coefficient, or $\chi^{(3)}$, the Kerr coefficient) having a non-zero value aligned along the direction of the electric field. For example, the leads may be coupled to a voltage source that imposes a controllable (e.g., programmable) voltage difference, thereby generating an electric field in the waveguide structure, as illustrated in FIG. 10. Additionally or alternatively, a guided mode supported by the waveguide structure may have a direction of polarization aligned with the x-direction.

In some embodiments, the first dielectric portion and the second dielectric portion are configured as a second layer coplanar to the slab layer and disposed adjacent to a first side of the slab layer. For example, the first and second dielectric portions may be grown (e.g., using epitaxy or another method such as metal organic chemical vapor deposition, molecular beam epitaxy, physical vapor deposition, sol-gel, etc.) onto the first side of the slab layer, such that the first and second dielectric layers are directly coupled to the slab layer. Alternatively, in some embodiments an intervening layer may be disposed between the slab layer and the first and second dielectric layer, such that the slab layer and the first and second dielectric layers are indirectly coupled. The intervening layer may be composed of an oxide material, in some embodiments.

The first dielectric portion and the second dielectric portion may be separated by a gap region, e.g., gap region 243 or 343. In some embodiments, the gap region may have been etched out, and may be filled with a cladding material. In some embodiments, both the first and second dielectric portions may be grown as a single second layer over the slab layer, and a region may be subsequently etched out to separate the first and second dielectric portions. This etched region may be subsequently filled with a cladding material. Alternatively, the etched region may be left empty (i.e., may be filled with air or vacuum).

In some embodiments, the first dielectric portion and the second dielectric portion have a dielectric constant greater than a dielectric constant of the first material in the direction separating the first and second dielectric portions. The dielectric constant of the first dielectric portion and the second dielectric portion may be greater than the dielectric constant of the waveguide structure at a first temperature that is greater than 1 mK, ess than 77K, less than 150K, and/or within another temperature range. In some embodiments, the first material is a transparent material having an index of refraction that is larger than an index of refraction of the first and second cladding layers. In some embodiments, a ratio between the dielectric constant of the first and second dielectric portions and the dielectric constant of the first material is 2 or greater.

The following paragraphs describe various design features that differ between the architectures shown in FIGS. 2-8.

Figure 2:
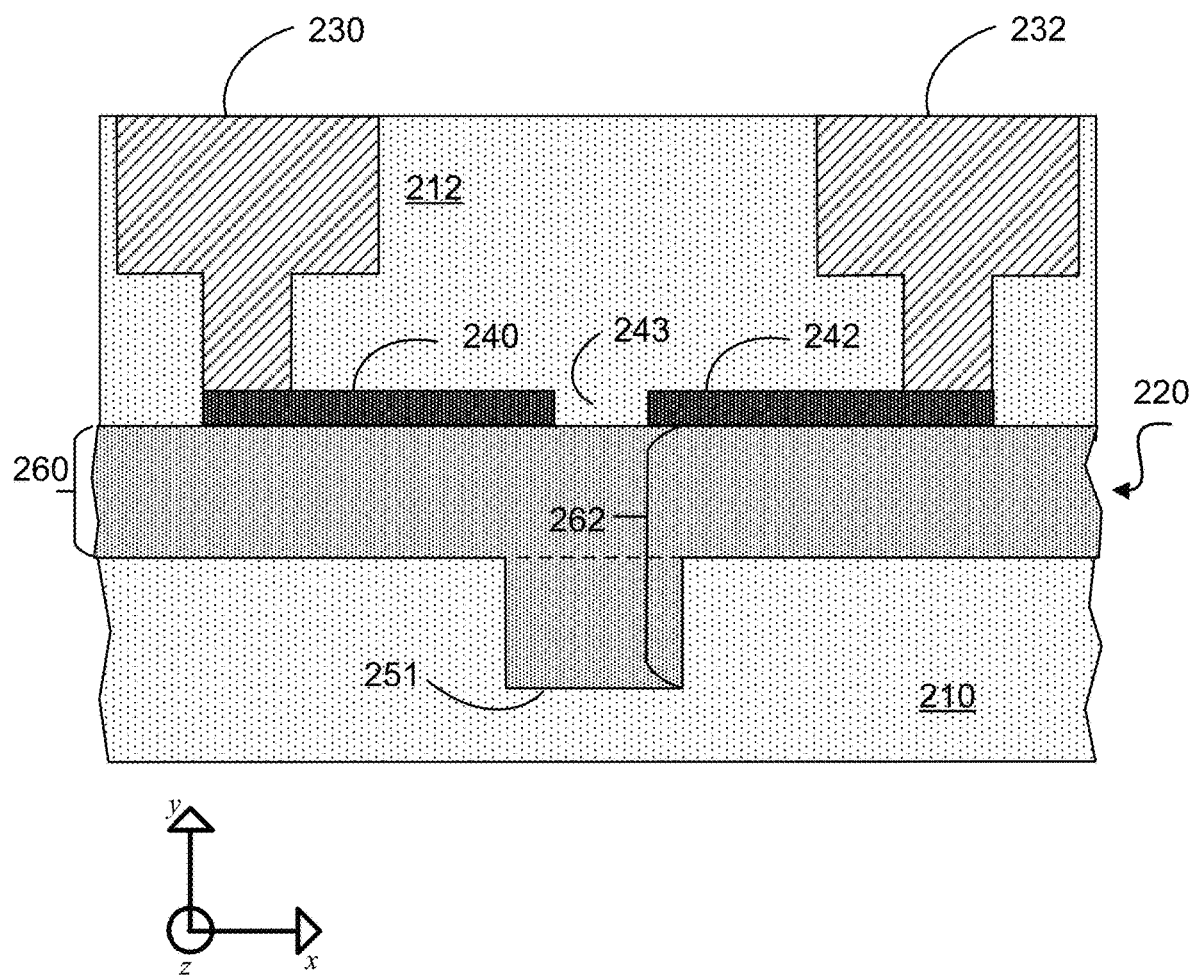
FIG. 2 is a simplified schematic diagram illustrating a cross section of a waveguide structure incorporating high-K electrodes placed opposite the waveguide ridge, according to some embodiments.

FIG. 2 illustrates an architecture where the ridge portion of the waveguide structure (251) is disposed on the bottom of the slab layer and extends into the first cladding layer (210). As illustrated in FIG. 2, the combination of the ridge portion and the slab layer has a first thickness (262) greater than a second thickness (260) of the slab layer alone (220), and the excess of the first thickness relative to the second thickness extends into the cladding layer (210) on the bottom side of the slab layer. As illustrated in FIG. 2, the first dielectric portion (240) and the second dielectric portion (242) are coupled to the slab layer (220) on the top side of the slab layer opposite the bottom side. Further, the first electrical contact (230) and the second electrical contact (232) are disposed on the top side of the slab layer (220). It should be noted that the terms "top" and "bottom" are used for clarity in reference to the perspective illustrated in the Figures, and do not necessarily refer to any particular orientation relative to the overall device.

Figure 3:
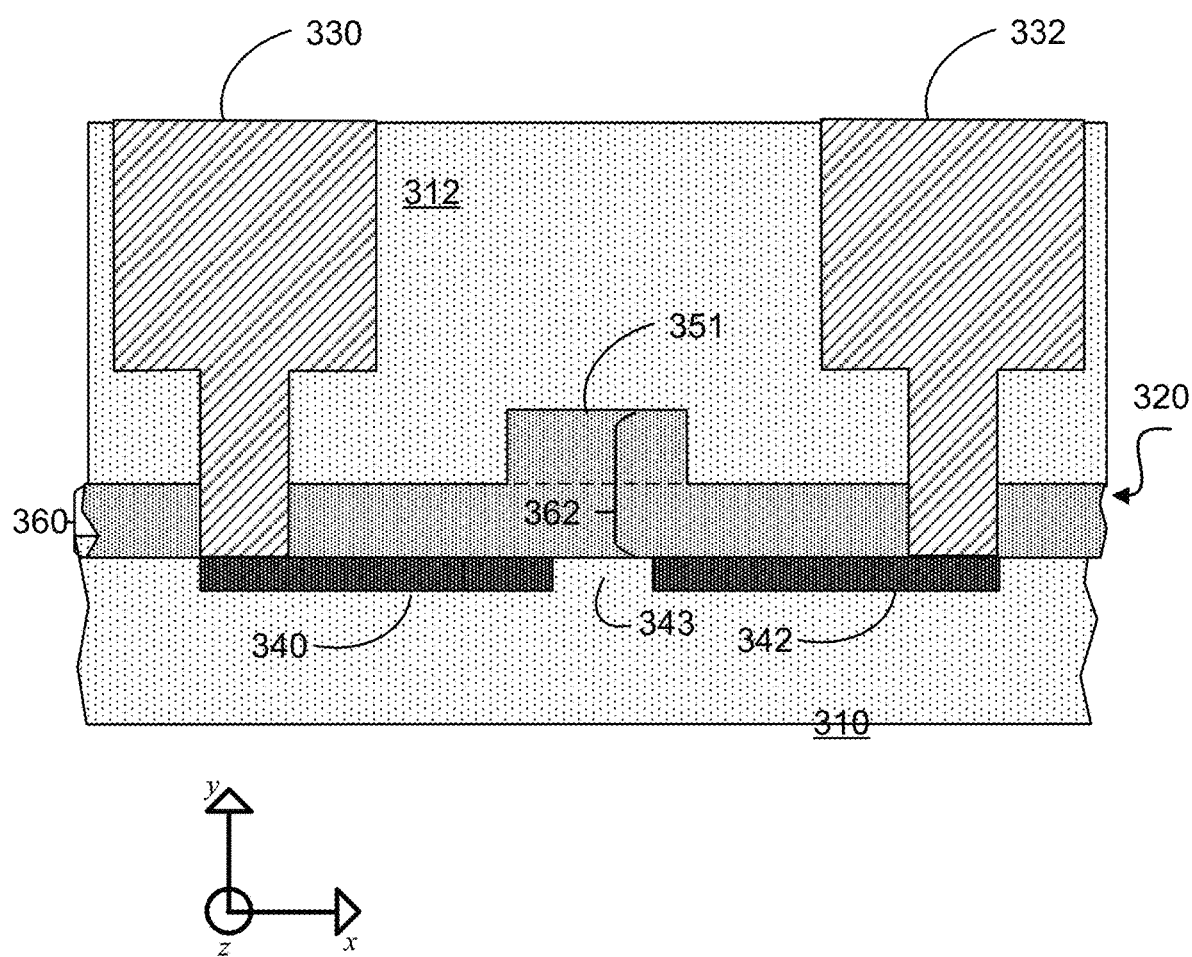
FIG. 3 is a simplified schematic diagram illustrating a cross section of a waveguide structure incorporating high-K electrodes placed opposite the waveguide ridge with penetrating leads, according to some embodiments.

FIG. 3 illustrates an architecture where the ridge portion of the waveguide structure (351) is disposed on the top side of the slab layer and extends into a first cladding layer (312), the first dielectric portion and the second dielectric portion are coupled to the slab layer on the bottom side of the slab layer opposite the top side. As illustrated, the combination of the ridge portion and the slab layer has a first thickness (362) greater than a second thickness (360) of the slab layer alone (320), and the excess of the first thickness relative to the second thickness extends into the first cladding layer (312) on the top side of the slab layer (320). As illustrated in FIG. 3, the first dielectric portion (340) and the second dielectric portion (342) are coupled to the slab layer (320) on the bottom side of the slab layer opposite the top side. Further, the first electrical contact (330) is coupled to the first dielectric portion (340) by penetrating through the slab layer (320) from the top side of the slab layer to the bottom side of the slab layer, and the second electrical contact (332) is coupled to the second dielectric portion (342) by penetrating through the slab layer (320) from the top side of the slab layer to the bottom side of the slab layer.

Figure 4:
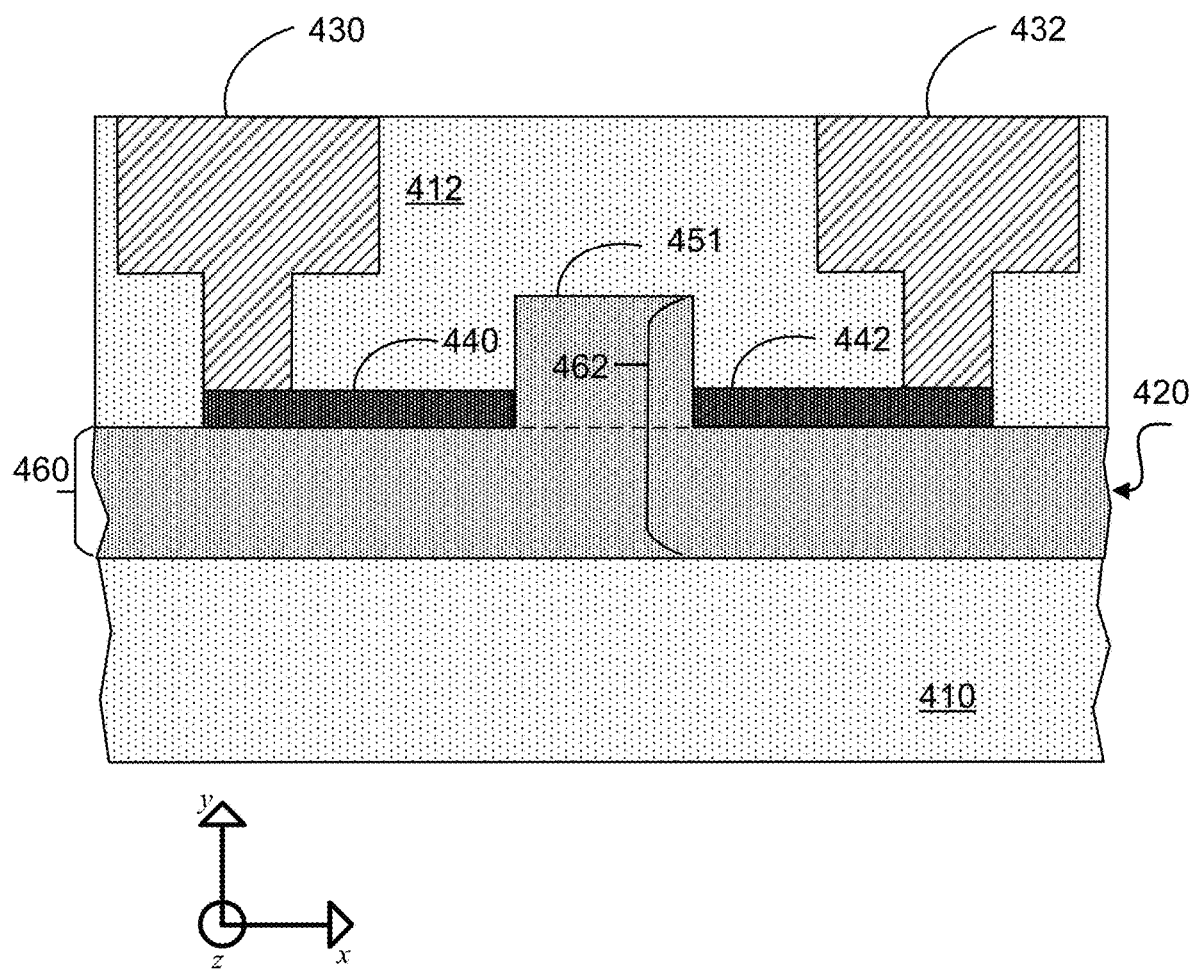
FIG. 4 is a simplified schematic diagram illustrating a cross section of a waveguide structure incorporating high-κ electrodes placed on the same side as the waveguide ridge, according to some embodiments.

FIG. 4 illustrates an architecture where the combination of the slab layer and the ridge portion of the waveguide structure (451) has a first thickness (462) greater than a second thickness (460) of the slab layer (420), and the excess of the first thickness relative to the second thickness extends into the first cladding layer (412) on the top side of the slab layer. As illustrated in FIG. 4, the first dielectric portion (440) and the second dielectric portion (442) are coupled to the first material (420) on the top side of the slab layer. Further the first dielectric portion (440) and the second dielectric portion (442) abut the ridge portion of the waveguide structure (451).

Figure 5:
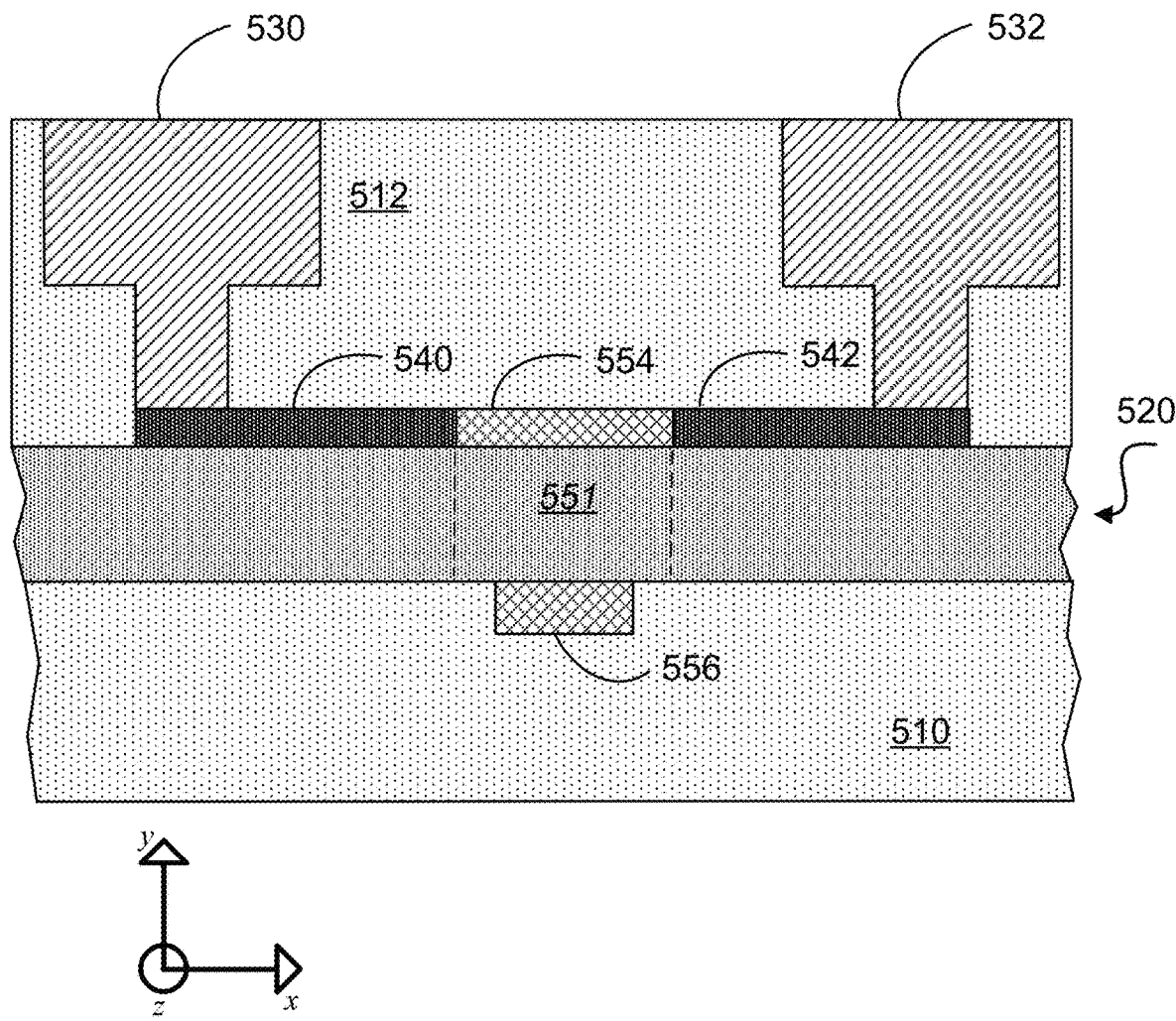
FIG. 5 is a simplified schematic diagram illustrating a cross section of a waveguide structure incorporating high-κ electrodes and exhibiting a sandwich structure, according to some embodiments.

FIG. 5 illustrates an architecture where the waveguide structure includes a first strip waveguide portion (554) and a second strip waveguide portion (556), where the first and second strip waveguide portions are composed of a second and third material, respectively, and where the slab layer (520) is disposed between the first strip waveguide portion (554) and the second strip waveguide portion (556). The first and second strip waveguide portions may be composed of the same or different materials. For example, they may each be separately composed of silicon nitride ($Si_3N_4$), silicon dioxide ($SiO_2$), aluminum oxide ($Al_2O_3$), or another similar material.

Figure 6:
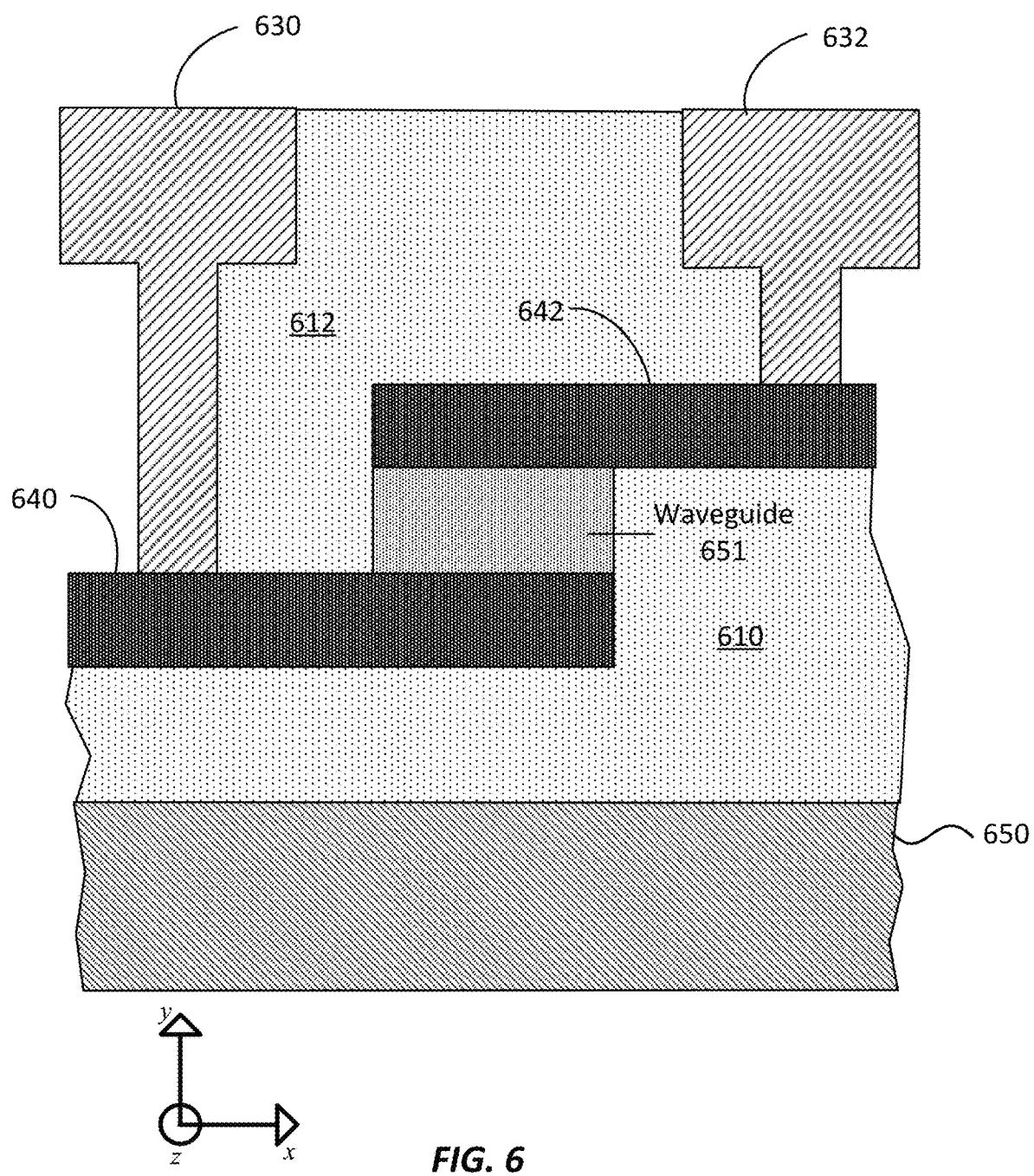
FIG. 6 is a simplified schematic diagram illustrating a cross section of a vertical waveguide structure incorporating high-κ materials, according to some embodiments.

FIG. 6 illustrates a vertical waveguide architecture where the first dielectric portion (642) is coupled to the slab layer (651) on the top side of the slab layer and the second dielectric portion (640) is coupled to the slab layer (651) on the bottom side of the slab layer opposite the top side. In other words, the first and second dielectric portions are coupled to the top and bottom sides of the waveguide structure, such that the induced electric field within the waveguide structure is oriented along the y-direction.

Figure 7:
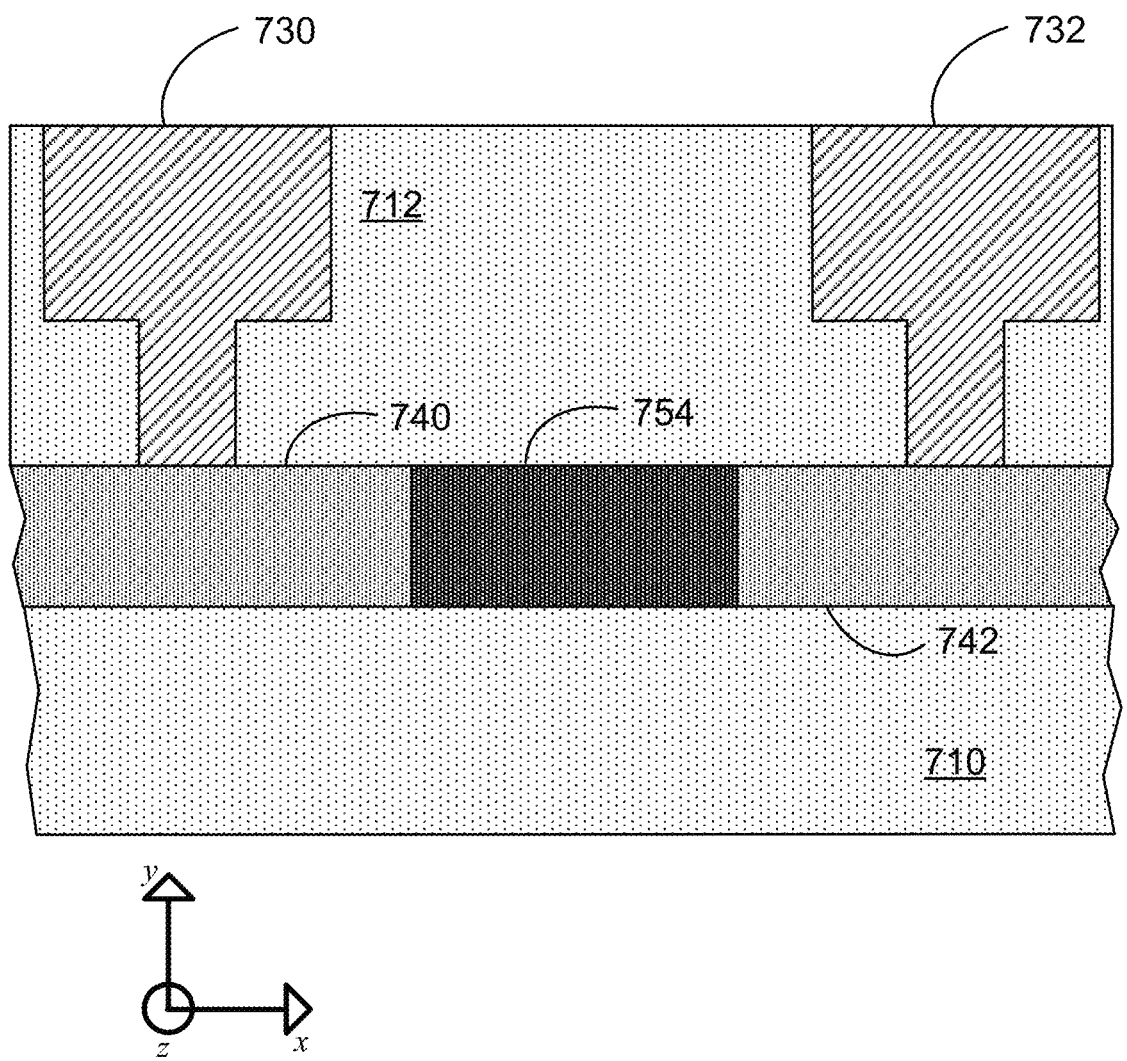
FIG. 7 is a simplified schematic diagram illustrating a cross section of a waveguide structure with the dielectric portions inline with the waveguide structure, according to some embodiments.

FIG. 7 illustrates a waveguide architecture where each of the first (740) and second (742) dielectric portions are disposed inline with the waveguide structure (754). In other words, each of the first and second dielectric portions and the waveguide structure are disposed within a single layer with a single width.

Figure 8:
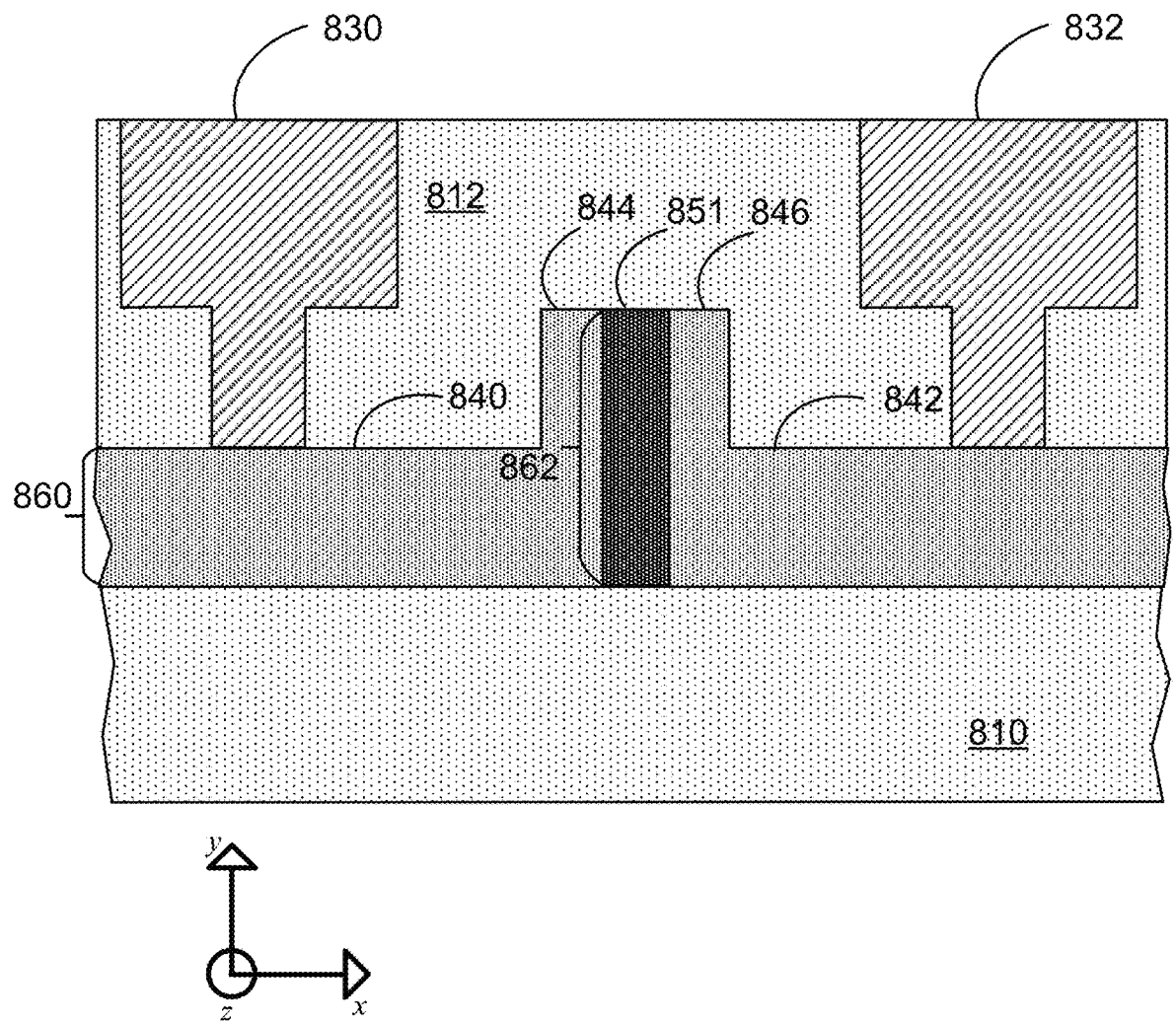
FIG. 8 is a simplified schematic diagram illustrating a cross section of a waveguide structure with dielectric portions exhibiting ridge-like profiles, according to some embodiments.

FIG. 8 illustrates a waveguide architecture where the first (840) and second (842) dielectric portions share a ridge-like profile with the waveguide structure (851), where the ridge-like profile extends into the first cladding layer (812). For example, the first dielectric portion (840) may include a ridge portion (844) having a thickness (862) that is greater than a thickness (860) of the remainder of the first dielectric portion, and the second dielectric portion (842) may include a ridge portion (846) having a thickness (862) that is greater than the thickness (860) of the remainder of the second dielectric portion. Further, the ridge portions of the first and second dielectric portions may exhibit the same thickness as the waveguide structure (851).

Figure 9:
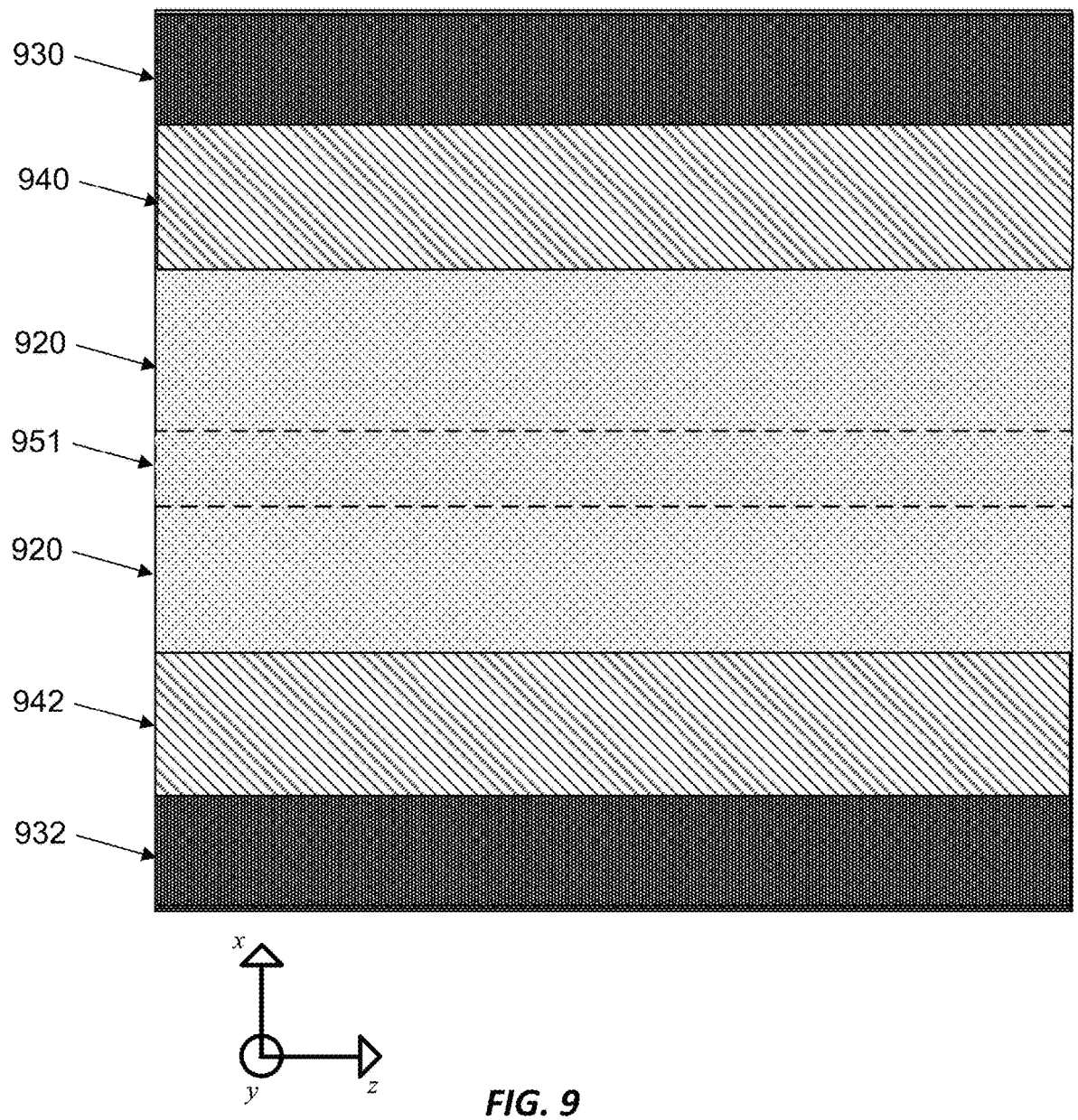
FIG. 9 is a simplified schematic diagram showing a top view of a waveguide structure, according to some embodiments.

FIG. 9—Top-Down View of Photonic Phase-Shifter

FIG. 9 is a top-down view of a photonic phase-shifter architecture, according to some embodiments. As illustrated, the phase-shifter may include first (930) and second (932) leads, first (940) and second (942) dielectric portions, a slab layer (920), and a ridge portion of the waveguide structure (951).

FIG. 10—Hybrid Quantum Computing System

FIG. 10 is a simplified system diagram illustrating incorporation of an electro-optic switch with a cryostat into a hybrid quantum computing system, according to some embodiments. In order to operate at low temperatures, for example liquid helium temperatures, embodiments of the present invention integrate the electro-optic switches discussed herein into a system that includes cooling systems. Thus, embodiments of the present invention provide an optical phase shifter that may be used within a hybrid computing system, for example, as illustrated in FIG. 8. The hybrid computing system 1101 includes a user interface device 1103 that is communicatively coupled to a hybrid quantum computing (QC) sub-system 1105. The user interface device 1103 can be any type of user interface device, e.g., a terminal including a display, keyboard, mouse, touchscreen and the like. In addition, the user interface device can itself be a computer such as a personal computer (PC), laptop, tablet computer and the like. In some embodiments, the user interface device 1103 provides an interface with which a user can interact with the hybrid QC subsystem 1105. For example, the user interface device 1103 may run software, such as a text editor, an interactive development environment (IDE), command prompt, graphical user interface, and the like so that the user can program, or otherwise interact with, the QC subsystem to run one or more quantum algorithms. In other embodiments, the QC subsystem 1105 may be pre-programmed and the user interface device 1103 may simply be an interface where a user can initiate a quantum computation, monitor the progress, and receive results from the hybrid QC subsystem 1105. Hybrid QC subsystem 1105 further includes a classical computing system 1107 coupled to one or more quantum computing chips 1109. In some examples, the classical computing system 1107 and the quantum computing chip 1109 can be coupled to other electronic components 1111, e.g., pulsed pump lasers, microwave oscillators, power supplies, networking hardware, etc.

In some embodiments that utilize cryogenic operation, the quantum computing system 1109 can be housed within a cryostat, e.g., cryostat 1113. In some embodiments, the quantum computing chip 1109 can include one or more constituent chips, e.g., hybrid electronic chip 1115 and integrated photonics chip 1117. Signals can be routed on- and off-chip any number of ways, e.g., via optical interconnects 1119 and via other electronic interconnects 1121.

Figure 11:
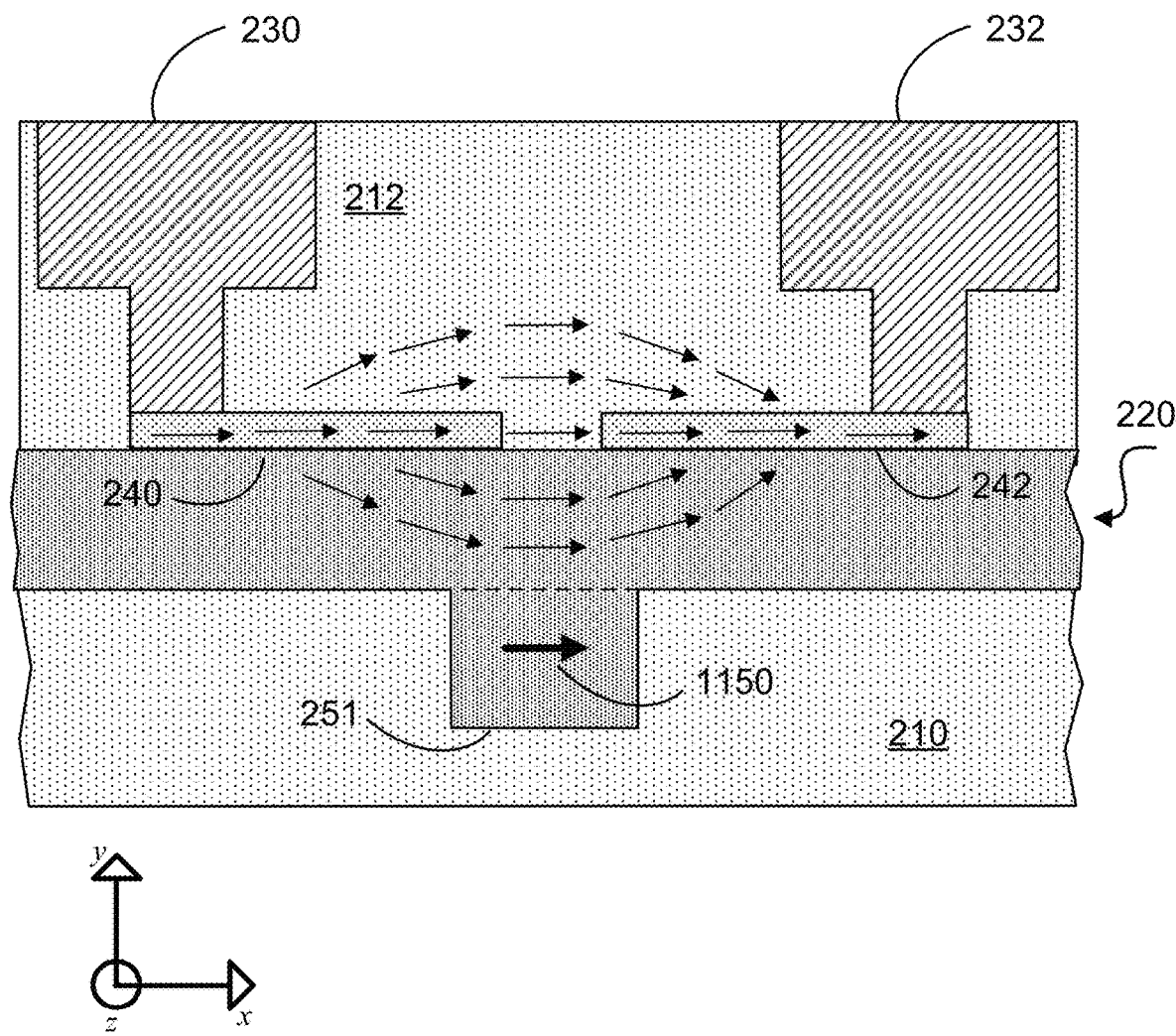
FIG. 11 is a simplified schematic diagram illustrating a cross section of a waveguide structure that shows the direction of an induced electric field, according to some embodiments.

FIG. 11—Induced Electric Field in Photonic Phase Shifter

FIG. 11 is a simplified schematic diagram illustrating a cross section of the waveguide structure shown in FIG. 2, where the direction of the induced electric field is illustrated with arrows, according to some embodiments. As illustrated, the small arrows show the induced electric field direction which generally points along the positive x-direction through the dielectric portions of the device. The electric field curves in a convex manner both above and below the dielectric portions, as illustrated. Furthermore, the large arrow (1150) pointing in the positive x-direction illustrates the direction of polarization of an optical mode that may travel through the slab layer and the waveguide.

ADDITIONAL EMBODIMENTS

The following numbered paragraphs describe additional embodiments.

In some embodiments, a device comprises a first cladding layer, a first electrical contact including a first lead coupled to a first dielectric portion, a second electrical contact including a second lead coupled to a second dielectric portion, a waveguide structure including a slab layer composed of a first material, and a second cladding layer. The slab layer is coupled to the first dielectric portion of the first electrical contact and the second dielectric portion of the second electrical contact. The first dielectric portion and the second dielectric portion have a dielectric constant greater than a dielectric constant of the first material in a first direction.

In some embodiments, the first dielectric portion is coupled to the slab layer on a first side of the slab layer and the second dielectric portion is coupled to the slab layer on a second side of the slab layer opposite the first side. See, e.g., FIG. 6.

In some embodiments, the first dielectric portion and the second dielectric portion are configured to generate an electric field along an x-direction in the waveguide structure.

In some embodiments, the waveguide structure is characterized by an electro-optic coefficient having a nonzero value aligned along the x-direction.

In some embodiments, a cryogenic device configured to maintain the first electrical contact, the second electrical contact, and the waveguide structure at or below 77 Kelvin.

In some embodiments, the dielectric constant of the first dielectric portion and the second dielectric portion is greater than the dielectric constant of the first material in the first direction at a first temperature that is greater than 1 mK.

In some embodiments, the dielectric constant of the first dielectric portion and the second dielectric portion is greater than the dielectric constant of the first material in the first direction at a first temperature that is greater than 1 mK and less than 77K or 150K.

In some embodiments, the first dielectric portion, the second dielectric portion, and the waveguide structure are disposed within a single layer having a first thickness, and the waveguide structure is disposed between the first and second dielectric portions. See, e.g., FIG. 7.

In some embodiments, the first dielectric portion and the second dielectric portion each include a respective ridge structure having a first thickness greater than a second thickness of a slab structure of the first and second dielectric portions. The first thickness is the same as the thickness of the waveguide structure. In these embodiments, the waveguide structure is disposed between the first and second dielectric portions and is coupled to the ridge structures of the first and second dielectric portions. See, e.g., FIG. 8.

In some embodiments, the first and second leads are composed of a metal.

In some embodiments, the first and second leads are composed of a semiconductor material.

In some embodiments, the first dielectric portion and the second dielectric portion are composed of one of barium strontium titanate, hafnium oxide, zirconium oxide, titanium oxide, graphene oxide, tantalum oxide, lead zirconium titanate, lead lanthanum zirconium titanate, or strontium barium niobate.

In some embodiments, the slab layer is composed of one of barium strontium titanate, lithium niobate, lead zirconium titanate, lead lanthanum zirconium titanate, aluminum oxide, aluminum nitride, or strontium barium niobate.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A device, comprising:
 a first cladding layer;
 a second cladding layer,
 a first electrical contact comprising a first lead and a first dielectric electrode, wherein the first lead is coupled to the first dielectric electrode;
 a second electrical contact comprising a second lead and a second dielectric electrode, wherein the second lead is coupled to the second dielectric electrode, and wherein the first dielectric electrode and the second dielectric electrode are separated by a gap region;
 a waveguide structure coupled to the first dielectric electrode of the first electrical contact and the second dielectric electrode of the second electrical contact, wherein the waveguide structure is disposed between the first and second cladding layers, wherein the waveguide structure is composed of a first material; and
 wherein the first dielectric electrode and the second dielectric electrode have a dielectric constant in a first direction greater than a dielectric constant in the first direction of the first material, the first dielectric electrode from the second dielectric electrode are separated along the first direction, and wherein the first and second dielectric electrodes are controllable to adjust an electric field within the waveguide structure.

2. The device of claim 1,
wherein the first and second dielectric electrodes and the waveguide structure are disposed within a single layer comprising a first width,
wherein the waveguide structure is disposed between the first and second dielectric electrodes within the single layer.

3. The device of claim 1,
wherein the first dielectric electrode comprises a first ridge portion having a first thickness greater than a second thickness of a remaining portion of the first dielectric electrode,
wherein the second dielectric electrode comprises a second ridge portion having the first thickness, wherein a remaining portion of the second dielectric electrode has the second thickness,
wherein the waveguide structure has the first thickness, and
wherein the first and second ridge portions and the waveguide structure extend into the first cladding layer.

4. The device of claim 1,
wherein the waveguide structure comprises a ridge portion and a slab layer, wherein the ridge portion is disposed between the first lead and the second lead along the first direction.

5. The device of claim 4,
wherein the ridge portion is disposed on a first side of the slab layer and extends into the first cladding layer, and
wherein the first dielectric electrode and the second dielectric electrode are coupled to the slab layer on a second side of the slab layer opposite the first side.

6. The device of claim 4, wherein the slab layer is composed of a different material than the ridge portion.

7. The device of claim 4,
wherein the slab layer is composed of barium titanate, and
wherein the first ridge portion is composed of silicon nitride.

8. The device of claim 4,
wherein the first ridge portion is composed of the first material.

9. The device of claim 4,
wherein the first ridge portion is disposed on a first side of the slab layer and extends into the first cladding layer, and
wherein the first dielectric electrode and the second dielectric electrode are coupled to the slab layer on the first side of the slab layer.

10. The device of claim 4,
wherein the ridge portion is disposed on a first side of the slab layer and extends into the first cladding layer,
wherein the first dielectric electrode and the second dielectric electrode are coupled to the slab layer on a second side of the slab layer opposite the first side.

11. The device of claim 10,
wherein the first electrical contact and the second electrical contact are disposed on the second side of the slab layer.

12. The device of claim 10,
wherein the first electrical contact is coupled to the first dielectric electrode by penetrating through the slab layer from the second side of the slab layer to the first side of the slab layer, and
wherein the second electrical contact is coupled to the second dielectric electrode by penetrating through the slab layer from the second side of the slab layer to the first side of the slab layer.

13. The device of claim 1,
wherein the first dielectric electrode and the second dielectric electrode are composed of strontium titanate, and
wherein the waveguide structure is composed of barium titanate.

14. The device of claim 1,
wherein the waveguide structure comprises a slab layer, a first strip waveguide portion and a second strip waveguide portion,
wherein the first and second strip waveguide portions are composed of a second and a third material, respectively, and
wherein the slab layer is disposed between the first strip waveguide portion and the second strip waveguide portion.

15. The device of claim 14,
wherein the second and third materials are silicon nitride.

16. The device of claim 1, wherein the first material has an index of refraction that is larger than an index of refraction of the first and second cladding layers.

17. The device of claim 1, wherein a ratio between the dielectric constant of the first and second dielectric electrodes and the dielectric constant of the first material in the first direction is 2 or greater.

18. The device of claim 1,
wherein the waveguide structure comprises a slab layer, and
wherein the first direction comprises a direction parallel to a surface of the slab layer.

19. An optical switch, comprising:
at least one input port;
at least one output port;
a Mach-Zehnder interferometer coupled to a beam splitter, wherein the Mach-Zehnder interferometer comprises a first arm and a second arm;
a photonic phase shifter comprised within the first arm of the Mach-Zehnder interferometer, the photonic phase shifter comprising:
a first cladding layer;
a second cladding layer,
a first electrical contact comprising a first lead coupled to a first dielectric electrode;
a second electrical contact comprising a second lead coupled to a second dielectric electrode; and
a waveguide structure coupled to the first dielectric electrode of the first electrical contact and the second dielectric electrode of the second electrical contact, wherein the waveguide structure is disposed between the first and second cladding layers, wherein the waveguide structure is composed of a first material;
wherein the first dielectric electrode and the second dielectric electrode have a dielectric constant in a first direction that is greater than a dielectric constant in the first direction of the first material, and
wherein the first and second dielectric electrodes are controllable to adjust an electric field within the waveguide structure.

20. The optical switch of claim 19,
wherein the first and second dielectric electrodes and the waveguide structure are disposed within a single layer comprising a first width,
wherein the waveguide structure is disposed between the first and second dielectric electrodes within the single layer.

* * * * *